United States Patent
Kirby et al.

(10) Patent No.: US 6,968,180 B2
(45) Date of Patent: *Nov. 22, 2005

(54) COUPON SYSTEMS AND METHODS OF USE OF COUPONS WITHIN A GROUP COMMUNICATIONS SYSTEM

(75) Inventors: Miles Alexander Lyell Kirby, San Diego, CA (US); Diane M. Winchell, San Diego, CA (US); Jon L. Korecki, San Diego, CA (US)

(73) Assignee: QUALCOMM INC, San Diego, CA (US)

( * ) Notice: Subject to any disclaimer, the term of this patent is extended or adjusted under 35 U.S.C. 154(b) by 779 days.

This patent is subject to a terminal disclaimer.

(21) Appl. No.: 09/957,170

(22) Filed: Sep. 19, 2001

(65) Prior Publication Data

US 2002/0151294 A1  Oct. 17, 2002

Related U.S. Application Data

(63) Continuation-in-part of application No. 09/835,262, filed on Apr. 12, 2001.

(51) Int. Cl.[7] .............................. H04M 3/42
(52) U.S. Cl. ................... 455/414.1; 455/416
(58) Field of Search ............. 455/459, 3.03, 455/3.01, 414.1, 422, 518, 517, 519, 509, 455/520, 406, 405, 408, 557, 556, 458, 463, 455/466, 416, 414.2; 705/35–40, 27, 26, 705/411; 379/202.01, 203.01, 204.01, 93.12, 379/114.13; 709/204, 223; 370/252

(56) References Cited

U.S. PATENT DOCUMENTS

| 5,754,939 A | 5/1998 | Herz et al. |
| 5,809,144 A | 9/1998 | Sirbu et al. |
| 6,681,114 B2 * | 1/2004 | Chang et al. ............. 455/456.3 |
| 6,725,052 B1 * | 4/2004 | Raith ......................... 455/518 |
| 2002/0164977 A1 * | 11/2002 | Link, II et al. ............ 455/414 |

* cited by examiner

Primary Examiner—Rexford Barnie
(74) Attorney, Agent, or Firm—Philip R Wadsworth; Robert J O'Connell

(57) ABSTRACT

Coupon systems and methods for delivering and redeeming coupons comprise a communications network defined by at least a wireless telephone network coupled to a computer network, where the communications network is associated with a plurality of communication devices that define a group communications net. A communications manager is operable to provide a group communication session by receiving a data packet from one member of the group communications net and transmitting the data packet through the computer network to at least one of the other members of the group communications net. A coupon module having a plurality of coupons is associated with the communications manager, and a delivery module is coupled to each of the coupon module, the communications manager, and the communications network. The delivery module is operable to monitor the group communication session and to deliver one of the plurality of coupons to the group communications net. Further, methods of delivering, authorizing and redeeming the coupons are disclosed.

18 Claims, 6 Drawing Sheets

US 6,968,180 B2

COUPON SYSTEMS AND METHODS OF USE OF COUPONS WITHIN A GROUP COMMUNICATIONS SYSTEM

CROSS-REFERENCE TO RELATED APPLICATIONS

This application is a continuation-in-part of U.S. patent application Ser. No. 09/835,262, filed Apr. 12, 2001 now U.S. Pat. No. 6,788,946.

BACKGROUND OF THE INVENTION

This invention relates to group, or point to multi-point, communication systems, and more particularly, to coupon systems and methods of use of coupons within a group communications system.

Group or point-to-multipoint communication systems have been used to provide communications generally between a central location and multiple users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

Another example of a point-to-multipoint communication system is a wireless push-to-talk system. Such a system allows a group of individuals, each having a wireless communication device, to communicate with other members of the group. Typically, a push-to-talk system relies on a single frequency, or dedicated channel, over which communications are received by the wireless communication devices. In most systems, only one member may transmit information to the other members at any given time. However, all members can listen to the dedicated broadcast channel to receive communications from the single member who is transmitting. Members desiring to transmit to other members of the system typically send an access request by depressing a push-to-talk button on their respective communication device that allows the user sole access to the dedicated channel.

Examples of uses of a push-to-talk system include workgroup communications, security communications, construction site communication, and localized military communications. The group of people requiring communications with each other is commonly known as a "net," and each member of the net may be referred to as a "net member."

Each net and net member represents a marketing opportunity for providers of goods and services. In typical group communications systems, however, this market opportunity is not accessible or definable. Further, in typical group communications systems, there is no mechanism for leveraging this market opportunity into a sale of a good or service. Additionally, typical providers of group communications services do not recognize the value of such market opportunities to providers of goods and services, thereby overlooking a potential revenue source.

BRIEF SUMMARY OF THE INVENTION

Thus, the coupon systems and methods of using coupons provided by the present invention overcome the above-identified drawbacks. These coupon systems and methods provide for the delivery of coupons within a group communications system, and the authentication and redemption of the coupon in a transaction for goods or services. A coupon module delivers the coupon to a communications device associated with a group communications system. The coupon, in a format suitable for transmission with the group communications system, comprises verifiable characteristics that may be authenticated by a merchant upon redemption of the coupon with respect to a good or service.

In one embodiment, a coupon system comprises: a communications network defined by at least a wireless telephone network coupled to a computer network, the communications network associated with a plurality of communication devices that define a group communications net; a communications manager operable to provide a group communication session by receiving a first-type of data packet from one member of the group communications net and transmitting the first-type of data packet through the computer network to at least one of the other members of the group communications net; a coupon module having a plurality of coupons, wherein each of the plurality of coupons comprises a second-type of data packet; and a delivery module coupled to each of the coupon module, the communications manager, and the communications network, the delivery module operable to monitor the group communication session and to deliver one of the plurality of coupons to at least one member of the group communications net.

In another embodiment, a coupon system comprises: a communications network defined by at least a wireless telephone network coupled to a computer network, the communications network associated with a plurality of communication devices that define a group communications net; a coupon module having a plurality of coupons, wherein each of the plurality of coupons comprises data comprising an identification characteristic such that each coupon can be authorized; a controller module coupled to each of the coupon module and the communications network, the controller module operable to provide a group communication session by receiving a data packet from one member of the group communications net and transmitting the data packet through the computer network to at least one of the other members of the group communications net, and the controller module further operable to monitor the group communication session and to deliver a predetermined one of the plurality of coupons to at least one communications device associated with the group communications net; and a delivery manager coupled to the controller module, the delivery manager operable to select the predetermined coupon from the plurality of coupons based on predetermined delivery characteristics.

In a further embodiment, a coupon system comprises: a communications network defined by at least a wireless telephone network coupled to a computer network, the communications network associated with a plurality of communication devices that define a group communications net; a coupon module having a plurality of coupons; a controller module coupled to each of the coupon module and the communications network, the controller module operable to provide a group communication session by receiving a data packet from one member of the group communications net and transmitting the data packet through the computer network to at least one other member of the group communications net, the controller module further operable to monitor the group communication session and deliver a predetermined one of the plurality of coupons to the group communications net, and the controller module further operable to generate an activity log for each of the plurality of communication devices tracking participating in the group communication session and receipt of the predetermined coupon; and a billing module operable to receive the activity log and generate a bill having an amount due for each of the plurality of communication devices, wherein the amount due is discounted based on the tracked receipt of the predetermined coupon associated with the respective communication device.

In yet another embodiment, a coupon system operable with a communications network associated with a plurality of communications devices defining members of a group, comprises: a communications manager connectable to the communications network and to at least two members of the group, the communications manager operable to provide a group communication session by receiving a transmission from one member of the group and forwarding the transmission through the communications network to at least one other member of the group, wherein the communications network comprises at least a wireless telephone network coupled to a computer network, wherein the transmission comprises a data packet; a coupon module having a plurality of coupons each comprising a data packet; and a controller module connectable to each of the coupon module and the at least two members of the group, the controller module operable to monitor the group communication session and deliver a predetermined one of the plurality of coupons to the group according to a predetermined delivery instruction.

In another embodiment, a method for delivering a coupon comprises: monitoring a group communication session among a plurality of communications devices associated with a communications network, the communications network comprising at least a wireless telephone network coupled to a computer network; and transmitting one of a plurality of coupons via the communications network to the plurality of communications devices.

In a further embodiment, a method for delivering a coupon, comprises: receiving identification of a plurality of communications devices to be included in a group communications session, where each of the plurality of communications devices is associated with a communications network that comprises at least a wireless telephone network coupled to a computer network; establishing the group communications session by receiving a data packet from one communications device and transmitting the data packet through the computer network to at least one of the other communications devices; and delivering according to predetermined delivery characteristics one of a plurality of coupons via the communications network to the communications devices participating in the group communications session.

In yet another embodiment, a system for delivering a coupon comprises: a means for networking a plurality of communications devices, the networking means comprising at least a wireless telephone network coupled to a computer network, the plurality of communication devices defining a group communications net; a means for storing a plurality of coupons; and a means for controlling communications coupled to each of the storing means and the networking means, the communications controlling means operable to provide a group communication session by receiving a data packet from one member of the group communications net and transmitting the data packet through the networking means to at least one other member of the group communications net, the communications controlling means further operable to monitor the group communication session and deliver a predetermined one of the plurality of coupons to the group communications net.

In still another embodiment, a system for delivering a coupon via a communications network to a plurality of communications devices defining members of a group, comprises: a means for transmitting communications connectable to the communications network and to at least two members of the group, the transmitting means operable to provide a group communication session by receiving a transmission from one member of the group and forwarding the transmission through the communications network to at least one other member of the group, wherein the communications network comprises at least a wireless telephone network coupled to a computer network, wherein the transmission comprises a data packet in an internet protocol format; a means for storing a plurality of coupons each comprising a data packet; and a messaging means connectable to each of the storing means and the at least two members of the group, the messaging means operable to monitor the group communication session and deliver a predetermined one of the plurality of coupons to the group according to a predetermined delivery instruction.

In a further embodiment, a method of authorizing a coupon comprises: receiving a coupon identifier associated with the coupon, the coupon transmitted as a data packet in an internet protocol format and received by a communications device associated with a group communications net operable within a communications network, the communications network comprising at least a wireless telephone network coupled to a computer network; and authorizing use of the coupon based on the coupon identifier.

DETAILED DESCRIPTION OF THE INVENTION

The present invention comprises coupon systems and methods for delivering coupons to communication devices within a communications net associated with a group communications system. In one aspect of the invention, a coupon module stores coupons that are delivered to the communications devices within the net under the management of a control module or coupon server, which monitor the activity of the net. In another aspect, a delivery manager module schedules the delivery of the coupons based on predetermined characteristics, such as a time period since the last coupon was delivered or a match between coupon characteristics and net member or net characteristics. In yet another aspect, the present invention comprises methods for authenticating and redeeming coupons delivered to communications devices via a group communications system.

Figure 1:
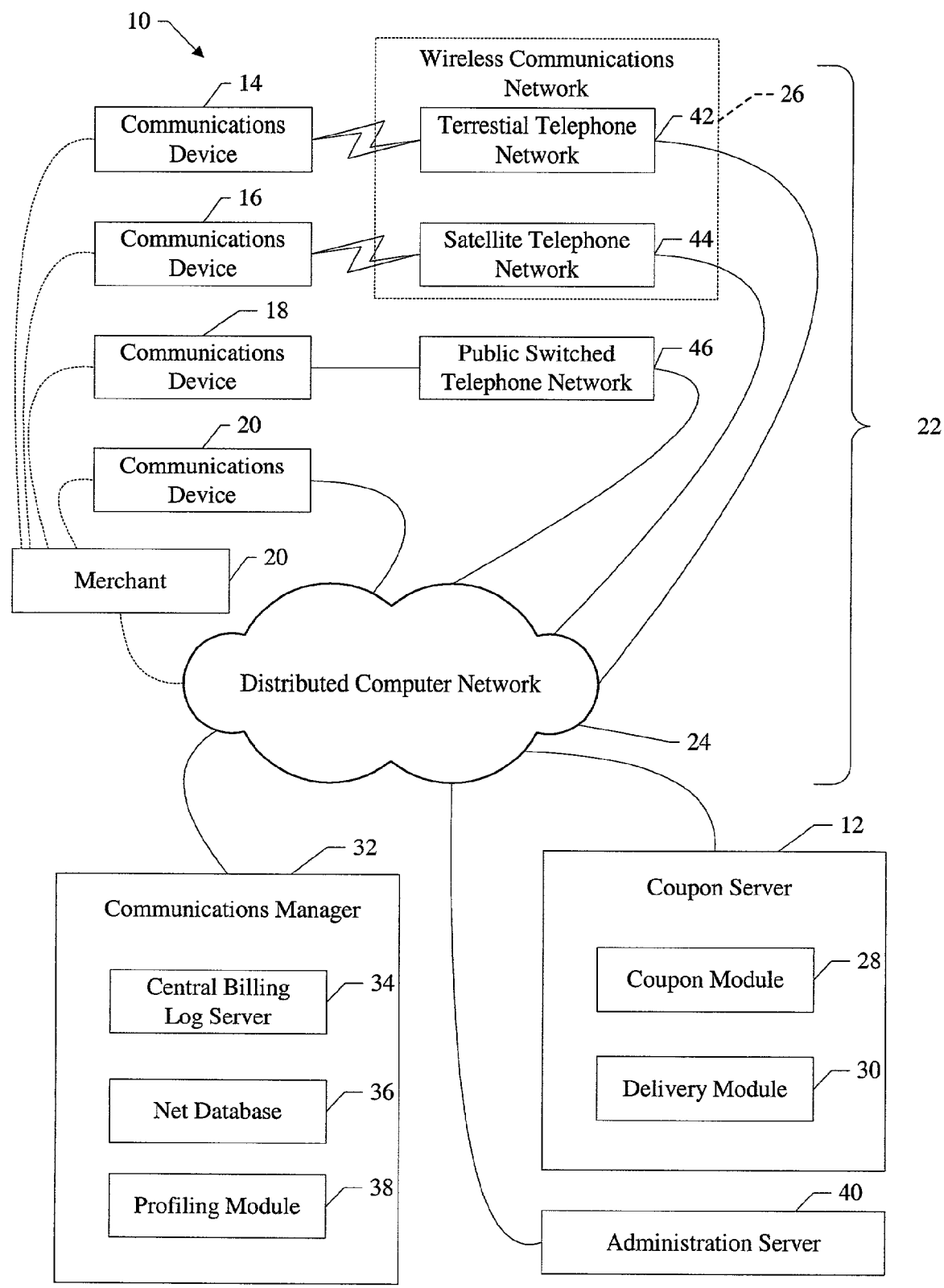
FIG. 1 is a functional block diagram of one embodiment of a coupon system within a group communications system.

Referring to FIG. 1, coupon system 10 that enables delivery to and use of coupons by members of a group communications system comprises, in one embodiment, coupon server 12 for delivering coupons to a plurality of communications devices or net members 14, 16, 18 and 20 defining a group or net within communications network 22. Communications network 22 comprises at least distributed computer network 24 and wireless communications network 26. Coupon server 12 comprises coupon module 28 for storing a plurality of coupons and their associated coupon characteristics, and delivery module 30 for monitoring the transmissions within the net and controlling the delivery of predetermined ones of the coupons. System 10 further comprises controller or communications manager 32 for establishing and controlling the net and the group communications session between communications devices 14, 16, 18 and 20. Further, communications manager 32 may include central billing log server 34 that tracks group or net activity and generates an associated user bill. Communications manager 32 may additionally include net database 36 for storing information associating each net with its net members, and a profiling module 38 for associating profile information with each net and/or net member. Thus, coupon server 12 may interrupt a group communication session to deliver coupons to net members according to predetermined delivery characteristics, such as based on a time period since the last coupon was delivered or a match between coupon characteristics and net or net member profile characteristics. Furthermore, after receiving a coupon, an end user or net member may redeem the coupon at merchant 39 in a transaction for goods or services.

Merchant 39 comprises any provider of goods or services, such as a retail outlet or distributor, or such as a manufacturer or provider of the good or service. Merchant 39 may be directly or indirectly linked to coupon server 12, such as via distributed computer network 24, and such as for authenticating any coupon presented for redemption.

Additionally, system 10 may include administration or subscription site server 40 for providing an interface between system 10 and the users of the system, such as to set-up or modify the groups or nets. Although coupon server 12, communications manager 32 and administration server 40 and their respective components are described separately herein, they may be integrated into a single computer system, such as a system manager-type server. Alternatively, coupon server 12, communications manager 32, administration server 40, and their components may be separable in any combination and distributed anywhere throughout system 10.

The combination of communications manager 32, administration server 40, communications devices 14, 16, 18 and 20, and communications network 22 may define a group communications system, also known as a push-to-talk system, a net broadcast service (NBS) system, a dispatch system, or a point-to-multi-point communications system. A defining characteristic of such an NBS system is that, generally, only one user may transmit information to other users at any given time. For example, in an NBS system, a group of communication device users associated with a net, individually known as net members, communicate with one another using a communication device assigned to each net member. The term "net" denotes a group of communication device users authorized to communicate with each other. The net operates over an existing communications system, without requiring substantial changes to the existing infrastructure. In one embodiment, the net broadcast service (NBS) system enables Internet Protocol (IP) communication devices to participate in a group voice and data conference. NBS may be a Voice over IP (VoIP) application. Voice communication is transmitted from a talker endpoint communication device to one or more listeners by encapsulating voice frames in IP datagrams. Data with voice may also be transmitted in this manner. Suitable examples of such an NBS system are described in U.S. patent application Ser. No. 09/518,682, entitled "Method and Apparatus for Enabling Group Communication Services in an Existing Communication System" filed Mar. 3, 2000, U.S. patent application Ser. No. 09/518,776 entitled "Method and Apparatus for Participating in Group Communication Services in an Existing Communication System", filed Mar. 3, 2000, and U.S. patent application Ser. No. 09/518,985, entitled "Method and Apparatus for Providing Group Communication Services in an Existing Communication System" filed Mar. 3, 2000, and are specifically incorporated by reference herein.

Communications network 22 provides a communications link between communications devices 14, 16, 18 and 20 and the system manager-type components, such as coupon server 12, communications manager 32 and administration server 28. Communications network 22 comprises a plurality of networks linked together to join together the communication device(s) associated with each distinct network to form a group or net. The plurality of networks may be any combination of one or more of any variety of global network and/or local network. Besides distributed computer network 24 and wireless communications network 26, communications network 22 may further include any other type of communications network capable of interfacing with distributed communications network 24 and/or wireless communications network 26. For instance, suitable examples of networks within communications network 26 include any system capable of transferring packet information using Internet Protocol (IP), such as a Code Division Multiple Access (CDMA) system, a Wideband Code-Division Multiple Access (WCDMA) system, a Time Division Multiple Access (TDMA) system, a General Packet Radio Service (GPRS) system, a Global System for Mobile Communications (GSM) system, satellite communication systems such as Globalstar™ or Iradium™, a Public Switched Telephone Network (PSTN), a global distributed computer network such as the Internet, a public carrier network, a private carrier or enterprise network, a local area network (LAN), a wide area network (WAN), a cable television-type network, an optical network, a network of personal digital assistants or smart appliances such as a Bluetooth™ technology network, a wireless application protocol (WAP) network, or a variety of other systems and networks.

Net members communicate with each other through communications network 22 using an assigned communication device, such as communication devices (CD) 14, 16, 18 and 20. CDs 14, 16, 18 and 20 include any device capable of transmitting and receiving packet information. Preferably, CDs 14, 16, 18 and 20 further include input, output and processing mechanisms for achieving the input, transmission, reception and/or output of the packet information. CDs 14, 16, 18 and 20 may be wireline or wireless communication devices such as terrestrial wireless telephones, wireline telephones having with push-to-talk capability, satellite telephones equipped with push-to-talk functionality, wireless video cameras, still cameras, audio devices such as music recorders or players, laptop or desktop computers, paging devices, personal digital assistants, smart appliances or any combination thereof. For example, CD 14 may comprise a wireless terrestrial telephone having a video camera and display, connected to wireless network 42, or CD 14 may be a mobile telephone such as a QUALCOMM QCP®-860 phone; CD 16 may comprise a wireless satellite telephone connected to a satellite network 44; CD 18 may comprise a wireline telephone connected to a public switched telephone network 46; and CD 20 may comprise a personal computer connected directly to distributed computer network 24. Furthermore, each CD may be able to send and receive information in either a secure mode, or a non-secure (clear) mode. Throughout the following discussion, reference to an individual CD may be expressed as a wireless push-to-talk phone. It should be understood, however, that reference to a CD is not intended to be limited as such, and may encompass other communication devices that have the capability to transmit and receive packet information in accordance with Internet Protocol (IP).

Although each communication device was described above with reference to a given, associated network, it should be understood that a plurality of communications devices may be associated with a single network and form a net. For example, a net may include a plurality of terrestrial telephones connected to a wireless communications system. It should be further understood that a plurality of different-type communications devices may further be associated with a given network. For example, a net may include a plurality of terrestrial telephones and a plurality of personal computers connected to a private or enterprise network that comprises a wireless communications network and a distributed computer network.

In system 10, a transmission privilege is defined which generally allows a single user to transmit information to other net members at any given time. The transmission privilege is granted or denied to requesting net members, depending on whether or not the transmission privilege is currently assigned to another net member when the request is received. The process of granting and denying transmission requests is known as arbitration. Other arbitration schemes evaluate factors such as priority levels assigned to each CD in determining whether a requesting net member is granted the transmission privilege.

In order to participate in system 10, each communications device 14, 16, 18 and 20 has the ability to request transmission privilege from controller or communications manager 32. Communications manager 32 generally manages the real-time and administrative operation of nets. Communications manager 32 may be any type of computer device having at least one processor and memory. In an embodiment, communications manager 32 is a Sun Netra T1™ workstation.

Communications manager 32 forms connections of individual communication devices to form one talk group, or net. The communications manager comprises a variety of functional capabilities in hardware and software that are configurable in different ways to accommodate different applications. Generally, the communications manager provides capability to manage real-time, administrative, and authenticity operations of nets, push-to-talk (PTT) request arbitration, maintenance and distribution of net membership and registration lists, call set-up and tear-down of necessary system and network resources, as well as overall control of net status. Further, communications manager 32 maintains a list of defined nets, defined as either clear or secure. A secure net relies on encryption provided by the individual CDs to provide authentication and guard against eavesdropping. Encryption for secure nets is implemented on an end-to-end basis, meaning that encryption and decryption takes place within each CD. Communications manager 32 generally operates without knowledge of security algorithms, keys, or policies.

Communications manager 32 manages remotely through either a communication system service provider, net members, or both, assuming that authorization is provided by the service provider. Communications manager 32 may receive net definitions through an external administration interface. For example, net members may request administrative actions through their service provider or administrate net functions through defined systems, such as a member-operated security manager or administration server that conforms to a communications manager 32 administration interface. Communications manager 32 can authenticate to high-grade commercial standards any party attempting to establish or modify a net.

Communications manager 32 maintains one or more databases and servers, such as central billing log server 34, net database 36 and profiling module 38, for managing information pertaining to individual net members as well as pertaining to each defined net. Central billing log server 34 collects and processes data associated with charging or billing a user for participating in a net. Net database 36 collects and processes data associating net members with nets. And, profiling module 38 collects and processes profile data associated with net members and/or nets.

Figure 2:
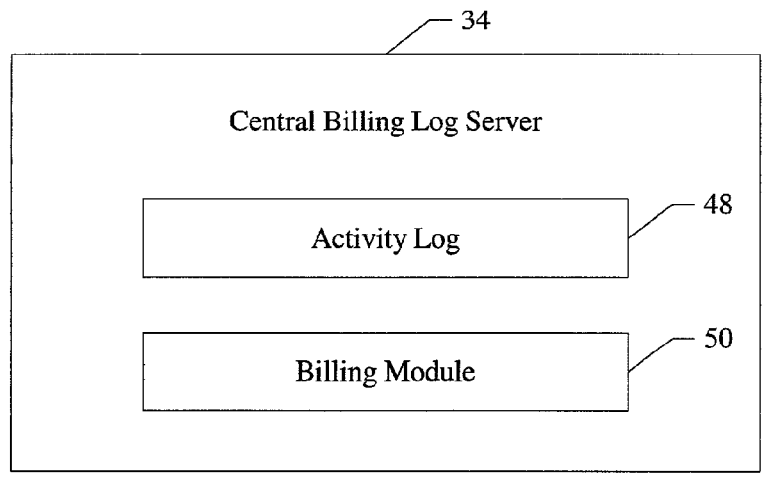
FIG. 2 is a block diagram of one embodiment of a central billing log server, and its components, associated with the system of FIG. 1.

Referring to FIG. 2, for example, central billing log server 34 may track and process identification information and participation times in an active net or group communications session for each net member over a given time period, such as a monthly billing cycle. Detailed log information of each user, such as which communication devices are active on the net, for how long, from where, and when and for how long each CD is a talker or a listener, is maintained. For instance, such data may be collected in activity log 48. Further, activity log 48 may be utilized to collect and maintain data associated with the delivery and use of coupons, such as the number of coupons received and the amount of time each net member listened to informational messages or advertisements associated with the coupons, over the given time period. Additionally, central billing log server 34 may include billing module 50 that comprises hardware, software, memory and programs for generating a bill with an amount due for each net member for a given billing cycle. Billing module 50 may include combinations of various tables associating active net talking and/or listening times with billable amounts or rates, various tables associating the number of coupons received and/or the time associated with receiving and listening to the informational messages or advertisements associated with the coupons with discount or credit amounts or rates, program plans having a given participation time for a given cost for each net member, net plans associating a cost for participating in one or more nets with each net member, and programs for comparing actual net participation to allowed plan net participation to determine the amount due, among other types of tables and programs. Other methodologies may also be utilized to determine an amount of money to charge a net user for association with a net and/or participation in a group communications session.

Figure 3:
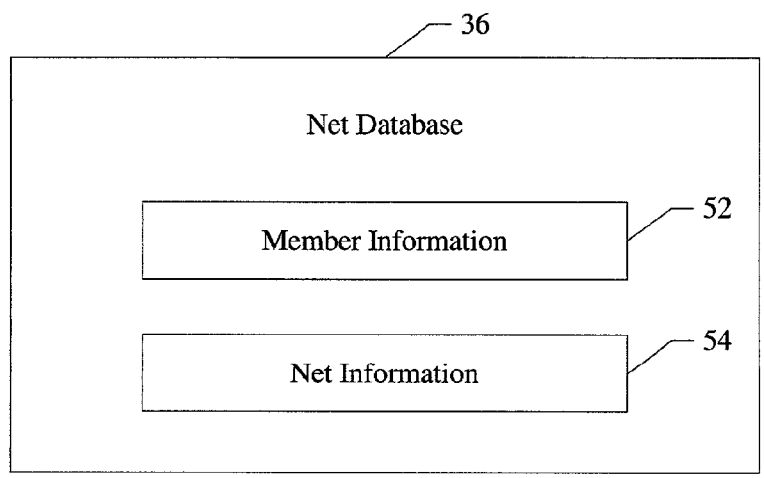
FIG. 3 is a block diagram of one embodiment of a net database, and its components, associated with the system of FIG. 1.

Referring to FIG. 3, for example, for each net member, net database 36 may include member information 52 such as a user name, account number, a telephone number, or dial number, associated with the member's CD, a Mobile Identification Number assigned to the CD, the current member's status in the net, such as whether the member is actively participating in the net, a priority code for determining how the transmission privilege is assigned, a data telephone number associated with the CD, an IP address associated with the CD, a URL identifier, and an indication of which nets the member is authorized to communicate, among the other types of information to facilitate a member's participation in a net. Additionally, net database 36 may further include net information 54 such as an identification of each CD associated with each net, an identification of the operating characteristics of the net, such as limitations on who may participate in the net, limits on the total number of net participants, identification of sponsors and/or managers or originators of the net, identification of whether the net is operated as a paid mode or sponsored mode net, identification of approved external administrative devices that may alter the characteristics and/or membership of the net, etc.

Figure 4:
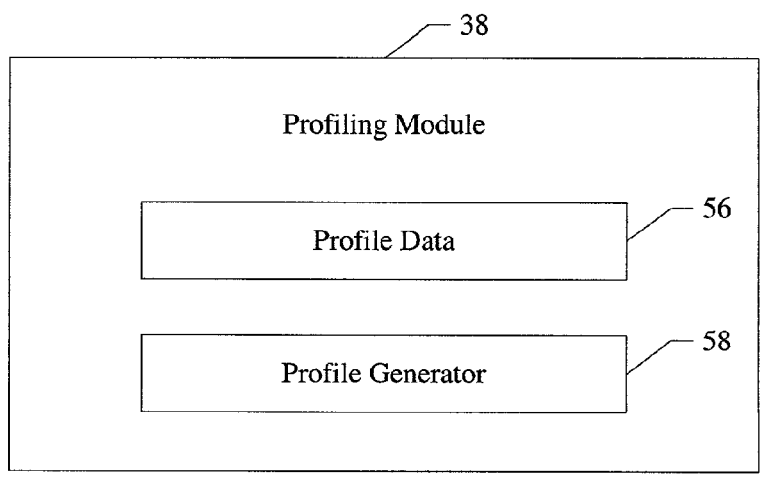
FIG. 4 is a block diagram of one embodiment of a profiling module, and its components, associated with the system of FIG. 1.

Other related types of information may also be stored by profiling module 38 with respect to each net and/or net member. For example, referring to FIG. 4, profiling module 38 may store profile data 56 associated with each net member or each net. Profile data 56 comprises information gathered from each user or net member, for example during a registration or questionnaire process, or associated with each user, for example through activity logs 48. For instance, when an end user registers their CD for participation in a group communication system or for participation in a given net, they may be presented with a series of questions to be answered. The answering of the questions may be mandatory or voluntary in order to gain authorization to access the system, to gain authorization to participate in a net, or to continue participation in a net such as through a real-time questionnaire. For example, profile data 56 may include any combination of group information and individual net member information, such as composite group or individual member personal preference information, interests, hobbies, group or individual topics or focus, marketing information, socioeconomic information, family information, personal information, buying habit information, credit information, group participation information, communication device usage information, and any other type of information that may be associated with a net member and that may have a value, such as to aid in directing coupons to the net members or nets, e.g. target marketing, or to aid the operator of the system in making access decisions, or to aid an originator of a net group in membership decisions, among other reasons. In an alternate embodiment, for example, profile data 56 may be stored with and comprise a portion of member information 52 and net information 54 within net database 36.

Additionally, profiling module 38 may include profile generator 58 for compiling, analyzing and classifying profile data 56 associated with each net member or each group/net. Further, profile generator 58 may create additional profile data 56 based on an analysis of the given profile data or activity log data for each net member or each net. For example, profile generator 58 may include software, hardware, firmware, etc., for presenting users with a registration request or questionnaire and for collecting answers to the questions and compiling them into profile data 56. Further, for example, the software of profile generator 58 may analyze the given profile data to categorize or classify the profile data, or to associate the given profile data with predetermined categories or classifications that may then be associated with the net member or net. The characterization of given profile data 56 may form additional profile data associated with a net or net user. Alternatively, or in addition, profile generator 58 may receive activity logs 48 for each group or individual user, as well as other information associated with the use of a communications device, such as a user's location as determined by a global positioning system (GPS) associated with each communications device, and compile, analyze and generate profile data 56 based on this information. In other words, profile generator 58 may receive and analyze any data associated with an individual user or group/net in order to characterize the data and associate the characterization with the user or group as part of profile data 56 such that, for example, the user or group may be targeted for delivery of a coupon having a matching characterization.

Figure 5:
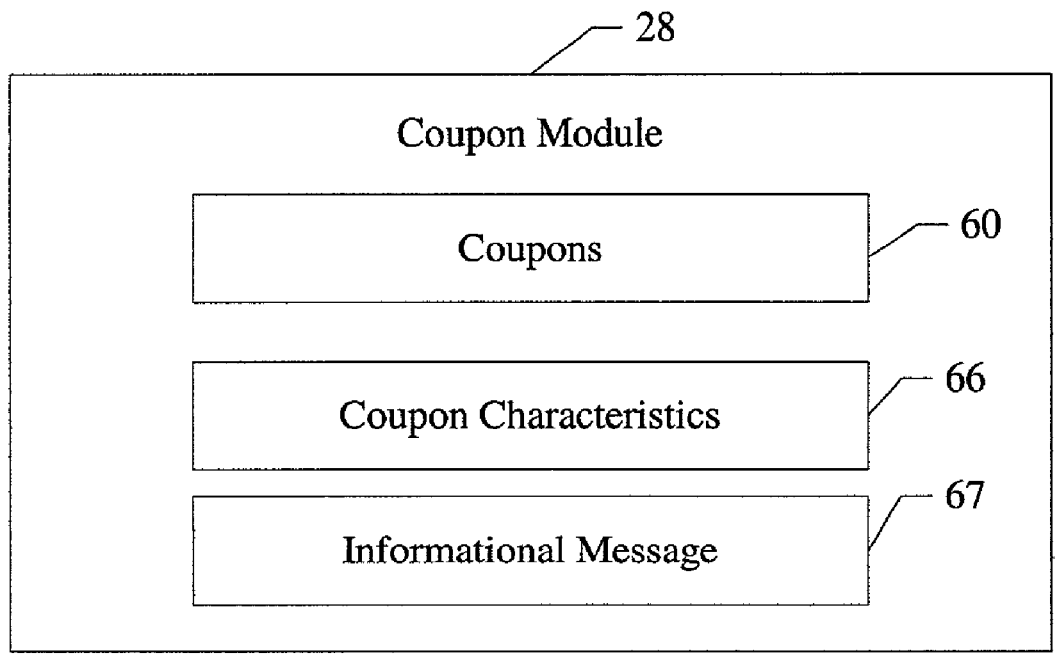
FIG. 5 is a block diagram of one embodiment of a coupon module, and its components, associated with the system of FIG. 1.
Figure 6:
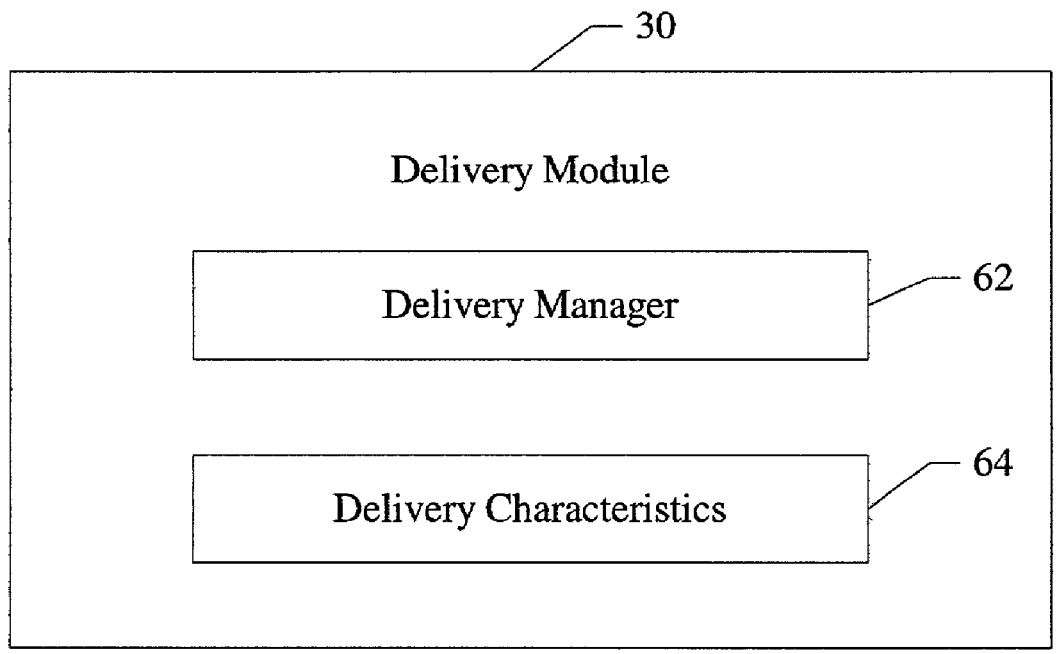
FIG. 6 is a block diagram of one embodiment of a delivery module, and its associated components, associated with the system of FIG. 1.

Referring to FIGS. 1, 5 and 6, coupon server 12 stores a plurality of coupons 60 in coupon module 28, and delivery manager 62 within delivery module 30 selects and delivers a predetermined coupon to a net or net member based on delivery characteristics 64. Referring to FIG. 5, coupon module 28 comprises a database for storing the plurality of coupons 60 and for storing coupon characteristics 66 associated with each of the coupons. Each coupon 60 may include a datagram having voice data, audio data, alphanumeric data, media data such as video, combinations thereof, and any other type of data that may be replicated and/or transferred over the communications network defined herein. In one embodiment, each coupon 60 is a prerecorded form of media capable of being stored for later, substantially simultaneous or instantaneous distribution to each member of the net, or in other words, delivery in real-time during an active group communications session. Additionally, each coupon 60 may have an associated informational message 67 having a duration, time period or length of play. For example, the plurality of coupons may include advertisements and information relating to discounts associated with a particular good or service. Typically, although not a requirement, each coupon 60 is associated with one or more coupon characteristics 66. Coupon characteristics 66 include data associated with a particular coupon 60 that defines, classifies or further characterizes the coupon. In this manner, coupon characteristics 66 are similar to profile data 56 associated with each net member or net. For example, coupon characteristics 66 may include data defining a topic or subject matter of the goods or services, or provider of the goods or services, associated with the coupon that may be utilized to target the coupon to a user or net having an interest in the content of the coupon. Additionally, coupon characteristics 66 may include data such as expiration date of the coupon, the redemption value of the coupon, and a coupon identification code. Coupon identifier may comprises a predetermined code that may be used to identify, authorize and redeem coupon 60. Suitable examples of a coupon identifier comprise a serial number, a UPC code, a bar code, an electronic code such as a key or signature, etc. So, for example, a coupon for receiving a discount on a rental car may have a coupon characteristic that associates the coupon with automobiles, driving, etc., which may then be matched to a net group having similar profile data that associates the group with coupon.

Referring to FIG. 6, as mentioned above, delivery module 30 comprises delivery manager 62 which manages the delivery of coupons 60 to nets and net members based on delivery characteristics 64. Delivery manager 62 may include hardware and software that monitor the activity of a net and/or net member and apply delivery characteristics 64 in order to determine when to deliver a coupon, and/or to select a particular coupon to deliver. Delivery characteristics 64 include a predetermined set of instructions that may be applied to a coupon or applied to a particular net or net member to determine when to deliver a coupon and/or what coupon to deliver. Delivery characteristics 64 may include one or a combination of: a time period since the last coupon was delivered or from the initiation of the group communications session; a timing status or time-sensitivity of a coupon; and a match between coupon characteristics and net or net member profile data. As such, delivery manager 62 monitors or receives reports of the group activity and may interrupt a group session and randomly deliver a coupon to a net, such as based on a duration of a group session or a timing status of a coupon. Alternatively, delivery manager 62 may selectively deliver a coupon to a net, such as by associating a net and a coupon based on a match between their profile data 56 and coupon characteristics 66, respectively. To determine a match, delivery module 30 may access coupon module 28 and profiling module 36 to compare the coupon characteristics of a given coupon with the profile characteristics of a given net or net member in order to target the delivery of the given coupon.

Figure 7:
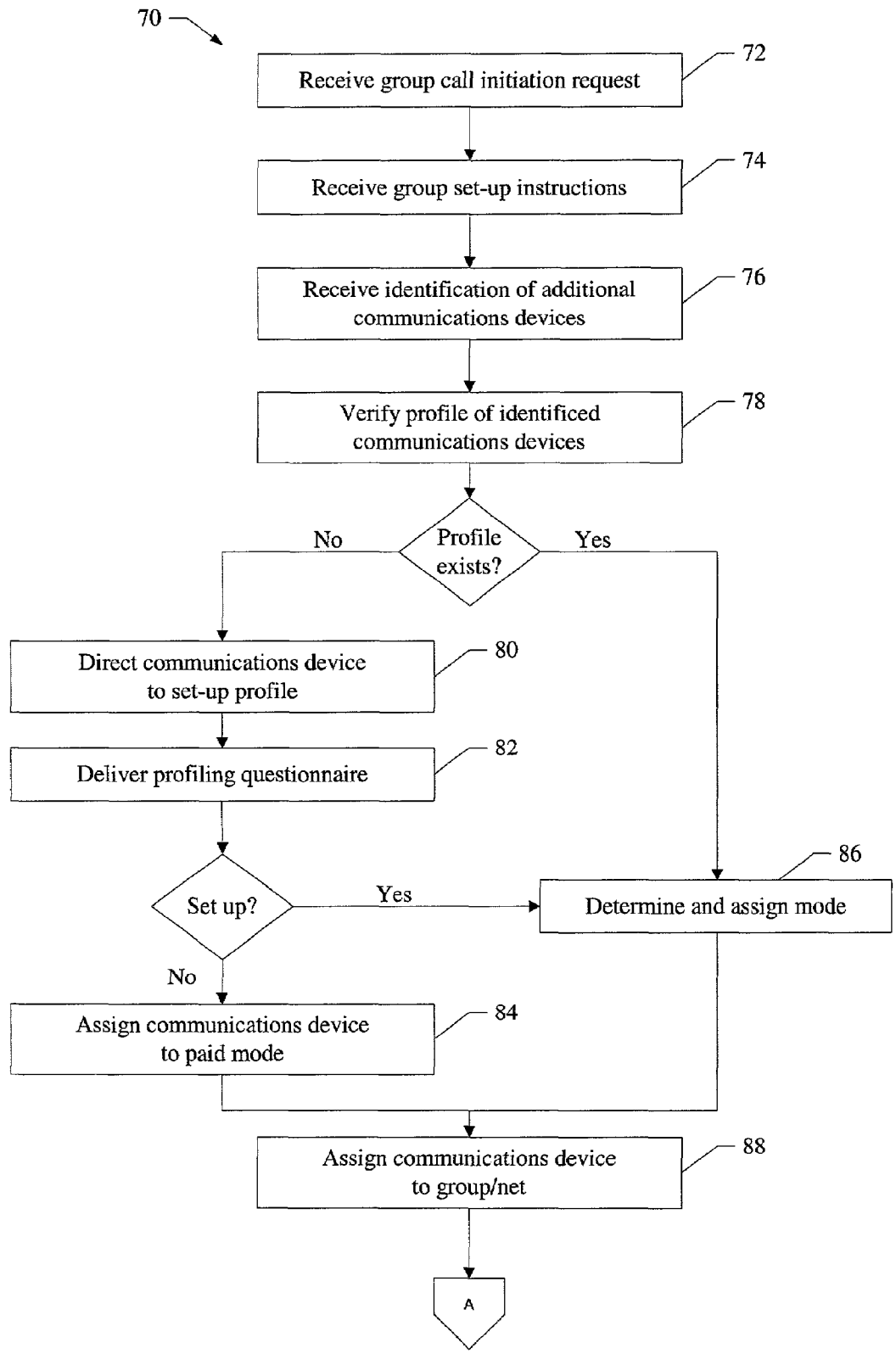
FIGS. 7 and 8 are functional block diagrams of one embodiment of a method for delivering coupons within a group communications system.
Figure 8:
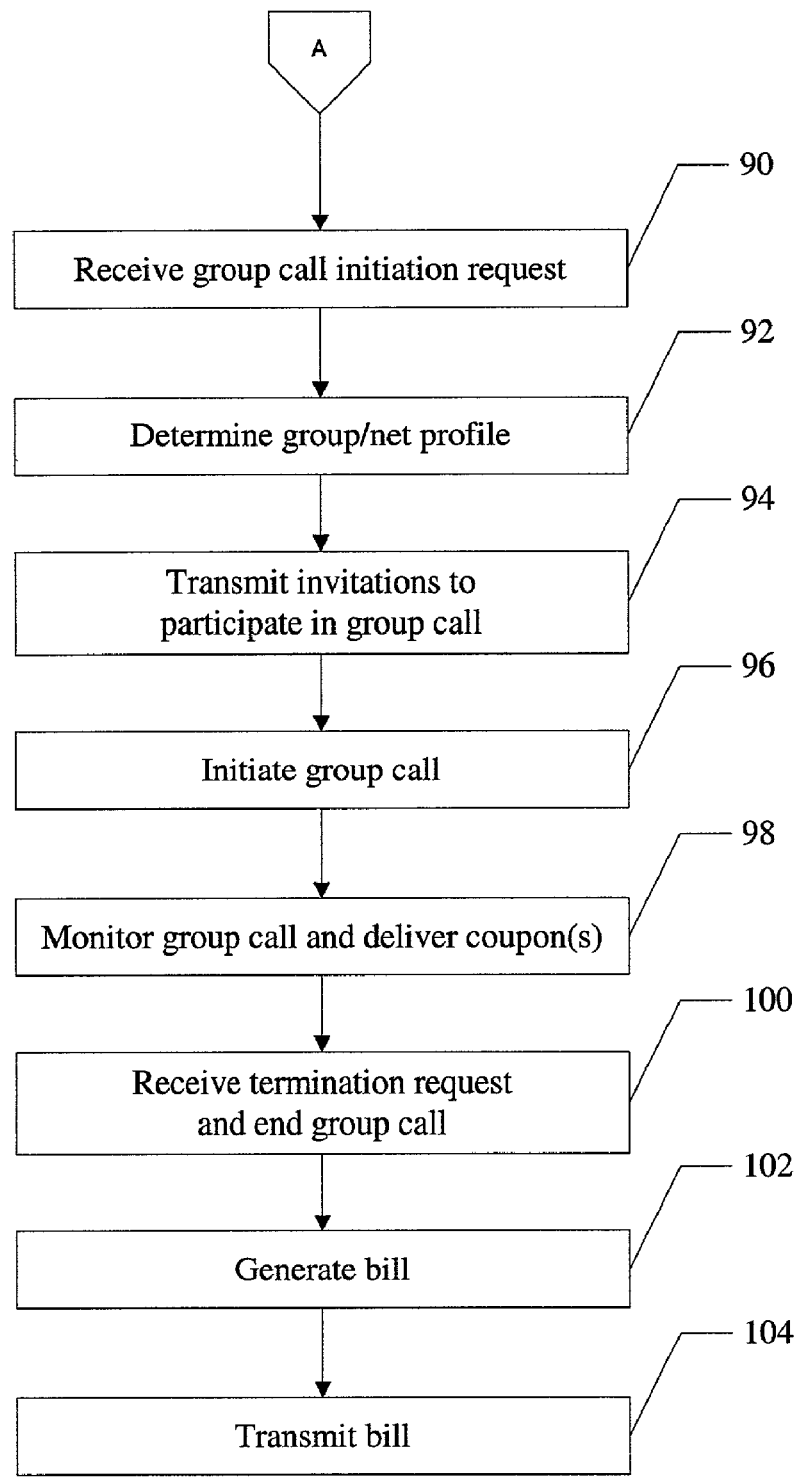

In operation, referring to FIGS. 7 and 8, one embodiment of a method 70 for delivering information within a group communications system, utilizing the embodiment of system 10 (FIG. 1) described above, comprises receiving a request from a user or group originator through a communications device to initiate a group call or group communications session (Block 72). For example, the user or group originator may contact the communications manager by dialing a predetermined number on a wireless telephone, where the predetermined number is associated with software within the communications manager for initiating a group communications session. Further, for example, the communications manager may receive group set-up instructions from the user, such as to establish the parameters of the group communications session (Block 74). The parameters of the group communications session that may be set-up by the user include, for example, selecting a sponsored mode, selecting a paid mode, naming the group or the session, providing a description of the subject matter of interest to or topic to be discussed by the group or during the session, etc. The sponsored mode may include a group communications session that the user or group originator intends to be sponsored or at least partially funded by an entity outside of the communications net, rather than being fully charged to each net participant. For example, when in the sponsored mode, coupons stored in the coupon server may be automatically delivered to the net members during the group communications session and each net member may have their cost of participating in the session reduced based on the number of coupons they receive and based on the number and duration of associated informational messages they listen to. In that case, the entity associated with each coupon, such as merchant 39 or provider of goods and services, may pay a fee for having their coupon delivered to the net. The fee paid by the entity may pay for or offset the cost of the group communication session for each net member, or may be offset costs for the provider of the group communications system. The paid mode may include a mode of a group communications session where each net member is directly charged for their participation in the group session. Typically, but not necessarily always, by selecting the paid mode, the user or group originator may enable the group to avoid receiving coupons during the active group communication session. It should be noted, however, that coupons may be delivered to net members regardless of the mode of the group communications session.

Further, the method comprises receiving an identification of additional communications devices to form the communications net and participate in the group communications session (Block 76). For example, the user or group originator may select a predefined group of communications devices, also known as a communications net, or the user may create a new, ad hoc group or communications net, or the user may select some combination of predefined groups and individual communication devices. The communications net may be selected from a list of predefined nets or from a list of users/communications devices, such as in a phone book or in a directory service, for example, stored within the user's communication device or within the communications manager. The method may include verifying that a user profile, comprising profile data, exists for each identified user or communications device associated with the communications net (Block 78). For example, the communications manager may access the profiling module to check for the existence of profile data associated with each identified user/communications device. If a user profile does not exist, then the selected user may be directed to set-up their own profile (Block 80). The identified user not having a profile may setup their profile in a variety of manners, such as by accessing the communications manager and answering a profiling questionnaire delivered by the profiling module (Block 82). For example, the identified user may respond to the profiling request on their communications device, such as over a wireless telephone network with a wireless phone or over a computer network with a personal computer, through the administration server, or by any other method that may be utilized to communicate with the communications manager. If the profiling questionnaire is not completed, then the identified user may be assigned to a paid mode (Block 84). Once an identified user has established a user profile, then the system determines the mode to associate with the identified user for the group call and assigns the mode (Block 86). For example, the user may identify a mode that overrides a group mode established in the group set-up, or vice versa. The communications manager then adds the identified user to the group or net (Block 88). If the identified user does not establish a profile, as mentioned above, then the identified user may be associated with a paid mode (Block 84) and the communications manager adds the identified user to the group or net (Block 88). In embodiments of the present invention, communication groups or nets may require all members to have the same designated mode, i.e. paid mode or sponsored mode, or alternatively net members may have different modes. For example, if the net comprises members associated with both paid and sponsored modes, then the communications manager may require the sponsored mode members to receive coupons and associated informational messages prior to joining the group session, or may only interrupt the group session to deliver the coupon to those members. If pre-delivering the coupons and optional informational messages, the communications manager may track prior group session lengths for each of the members and estimate an average group session length in order to determine the number of coupons and length of optional informational messages to pre-deliver to the sponsored mode members. Further, the communications manager may track each individual member's group sessions and coupons or informational messages received, and then pre-deliver more or less coupons for each member depending on the individual statistics associated with each member. Whether or not the group mode or the individually-identified mode takes priority may be a function of predetermined rules within the system, the group or the individual user profile.

Once the entire group has been identified, then the profiling module determines a group profile (Block 90). For example, the group profile comprises a composite characterization of the group based on the profile data associated with each individual user and/or based on group characteristics defined by the group originator, such as the group discussion topic(s). The individual profile data may include data provided by each individual or generated by the profiling module according to a predetermined set of instructions, such as an user profiling program, and based upon the received profile data. Similarly, the group profile data may be generated by the profiling module according to another predetermined set of instructions, such as a group profiling program, and based upon the received and generated user profile data. Further, after identification of the entire group, the group call is initiated by the communications manager which transmits invitations to the identified users, asking them to participate in a group communications session (Block 92). For example, the invitation may include information such as an identification of the group originator, the other group members, set-up information such as the mode and the identification of the topic or subject matter of interest, etc. Each identified user may then respond to the request, and if not already completed, provide profile data in order to participate in a sponsored mode. The communications manager initiates the group session, such as upon receiving the first acceptance of an invitation (Block 94). As such, the group session comprises at least the session originator and one other communications device. If the group session is a sponsored mode session, or if an individual participant is associated with a sponsored mode, then the group session is monitored and coupons are delivered to one or more of the net members (Block 96). As discussed above, the coupons may be delivered according to predetermined delivery characteristics, which may include one or a combination of: a time period since the last coupon was delivered; a time-sensitivity of a coupon; and a match between coupon characteristics and net or net member profile characteristics. For example, at a time when the coupon is to be delivered, the communications manager may give the coupon server the top transmission priority so that a transmission request by the informational server, to deliver a coupon and optionally the informational message, overrides any other transmission request. As such, at the designated time, once the net member with pre-existing transmission priority finishes their communication, the coupon server gains transmission priority and transmits the predetermined coupon, thereby inserting the coupon into the group communications session. Alternatively, there may be occasions, such as with time-sensitive coupons, where the communications manager terminates the priority of a communications device in the middle of a communication in order to allow the coupon server to deliver the coupon to the net. Further, the system monitors each communication device's receipt of each coupon, and optionally each associated informational message (Block 98). For example, the system tracks in a log the receipt of coupons and associates this data comprising, for example, the number of coupons received and the time period of informational messages listened to, with each communications device. Once the receipt of the coupon and optional informational message is completed, then the group session may continue in the normal manner. Again, it should be noted that coupons may be delivered prior or subsequent to a group communications session.

The group session may be ended by the group originator, or alternatively by any net member, such as by transmitting a predetermined termination signal to the communications manager or simply by the last person "hanging-up" or ending their participation in the group session (Block 100). Furthermore, based on the monitoring and logging of each user's participation in any group sessions and receipt of coupons and optional informational messages, the communications manager may generate a bill or charge associated with end user or net member for participating in group communications sessions, and the communications manager may discount the bill or issue a credit based on receipts of coupons and optional informational messages by the net member and/or net (Block 102). The bill may then be transmitted to the associated net member in any manner, such as electronically through the communications network or physically via a mail delivery service such as the United States Post Office (Block 104). Typical bill generation and collection services may be utilized when supplied with the group call and coupon receipt data from the present system.

Figure 9:
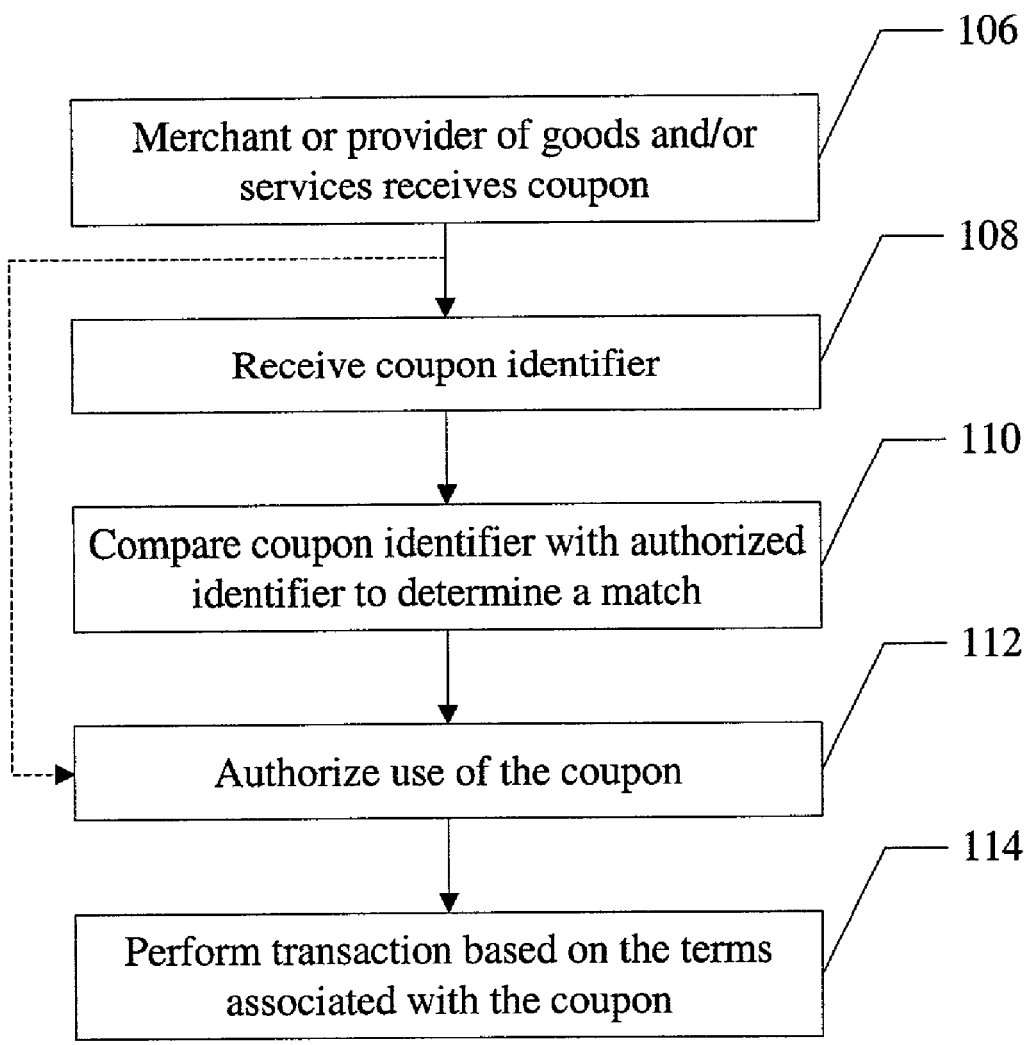
FIG. 9 is a functional block diagram of one embodiment of a method of authorizing and redeeming a coupon in a transaction for goods or services.

Upon receiving a coupon, a net member may utilize the coupon in a transaction for goods or services. Referring to FIG. 9, one embodiment of a method of a method of redeeming a coupon comprises presenting the coupon to a merchant or other provider of goods and services associated with the coupon (Block 106). The coupon may be presented in text, graphic, audio, electronic or any other suitable format for merchant or provider to validate the coupon. For example, the net member may display the coupon on the graphic display of their communication device, or the net member may tell the merchant a code number associated with the coupon. Optionally, the merchant or provider may then authorize the coupon, for example, by receiving a coupon identifier associated with the coupon (Block 108) and comparing the coupon identifier with at least one reference coupon identifier to determine a match (Block 110). For instance, the merchant or provider may communicate with coupon server via the communications network to compare the presented coupon identifier with the plurality of coupon identifiers, or authorized coupon identifiers, associated with a given coupon within coupon server. Thus, the merchant or provider may authorize use of the coupon (Block 112), based on the coupon identifier or simply based on the presentation of the coupon, and perform a transaction for goods and services based on the terms associated with the coupon (Block 114).

Therefore, the invention comprises a system for delivering a coupon via a communications network to a plurality of communications devices defining members of a group. The system comprises a means for transmitting communications connectable to the communications network and to at least two members of the group, where the transmitting means is operable to provide a group communication session by receiving a transmission from one member of the group and forwarding the transmission through the communications network to at least one other member of the group. The communications network comprises at least a wireless telephone network coupled to a computer network, where the transmission comprises a data packet in an internet protocol format. The system further comprises a means for storing a plurality of coupons each comprising a data packet and a messaging means connectable to each of the storing means and the at least two members of the group. The messaging means operable to monitor the group communication session and deliver a predetermined one of the plurality of coupons to the group according to a predetermined delivery instruction.

Thus, a communications device establishes the group communications session between the members of the net associated with a communications network that comprises at least a wireless network and a distributed computer network. The communications manager monitors or receives reports of the group activity and may randomly or selectively deliver a coupon to a net or net member. The communications of the net members, and the coupons comprise datagrams formatted according to an internet protocol, for example a voice over IP protocol. The random delivery of coupons, for example, may be based on a duration of a group session or a timing status of a coupon. The selective delivery of a coupon, for example, may be based on an association between the net or net member and a selected one of a plurality of coupons based on a match between their respective net or net member profile data and coupon characteristics. For example, to determine a match, the communications manager or coupon server may access coupon module and profiling module to compare the coupon characteristics of a given coupon with the profile characteristics of a given net or net member in order to target the delivery of the given coupon to the net or net member. A net members' participation in the group communications sessions, and their receipt of coupons and optional informational messages may be monitored and logged, and they may be billed an appropriate amount according to predetermined billing parameters based thereon. After receiving a coupon, the net member may redeem the coupon at a merchant. The merchant may authenticate the coupon by comparing the coupon identifier, such as a code number, to at least one authorized coupon identifier to determine a match, and hence to determine authorization of the coupon. As such, the net member may receive the benefit of a valid coupon in a transaction for goods or services. Therefore, the systems and methods of the present invention provide for the delivery of coupons within a group communications system and methods of use of the coupons.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

Other features and advantages of the invention are set forth in the following claims.

What is claimed is:

1. A coupon system, comprising:
    a communications network defined by at least a wireless telephone network coupled to a computer network, the communications network associated with a plurality of communication devices that define a group communications net;
    a communications manager operable to provide a group communication session by receiving a first-type of data packet from one member of the group communications net and transmitting the first-type of data packet through the computer network to at least one of the other members of the group communications net;
    a coupon module having a plurality of coupons, wherein each of the plurality of coupons comprises a second-type of data packet; and
    a delivery module coupled to each of the coupon module, the communications manager, and the communications network, the delivery module operable to monitor the group communication session and to deliver one of the plurality of coupons to at least one member of the group communications net.

2. The system of claim 1, wherein the first-type of data packet and the second-type of data packets comprise datagrams formatted according to a predetermined protocol suitable for transmission over the computer network.

3. The system of claim 2, wherein the predetermined protocol comprises an internet protocol.

4. The system of claim 2, wherein the computer network comprises the Internet and wherein the predetermined protocol comprises an internet protocol.

5. The system of claim 1, wherein the plurality of coupons each comprise a verifiable characteristic such that each coupon can be authenticated.

6. The system of claim 5, wherein the verifiable characteristic comprises a numeric code.

7. The system of claim 1, wherein the plurality of coupons comprise data selected from the group consisting of audio data, text data, and multi-media data.

8. The system of claim 1, wherein the communications system is operable to transmit and receive the first-type of data packet or the second-type of data packet in real-time.

9. The system of claim 1, wherein the communication network further comprises a network selected from the group consisting of a public switched telephone network, a land mobile radio network, and a satellite communications network.

10. A coupon system, comprising:
    a communications network defined by at least a wireless telephone network coupled to a computer network, the communications network associated with a plurality of communication devices that define a group communications net;
    a coupon module having a plurality of coupons, wherein each of the plurality of coupons comprises data comprising an identification characteristic such that each coupon can be authorized;
    a controller module coupled to each of the coupon module and the communications network, the controller module operable to provide a group communication session by receiving a data packet from one member of the group communications net and transmitting the data packet through the computer network to at least one of the other members of the group communications net, and the controller module further operable to monitor the group communication session and to deliver a predetermined one of the plurality of coupons to at least one communications device associated with the group communications net; and
    a delivery manager coupled to the controller module, the delivery manager operable to select the predetermined coupon from the plurality of coupons based on predetermined delivery characteristics.

11. The system of claim 10, wherein the predetermined delivery characteristics comprise a predetermined time interval measured from a time of the last-delivered coupon or from a time of an initiation of the group communications session.

12. The system of claim 10, wherein the predetermined delivery characteristics comprise a match between a group communications net profile characteristic and a coupon characteristic.

13. The system of claim 12, wherein the predetermined delivery characteristics comprise a match between a member profile characteristic and a coupon characteristic.

14. A coupon system, comprising:
a communications network defined by at least a wireless telephone network coupled to a computer network, the communications network associated with a plurality of communication devices that define a group communications net;
a coupon module having a plurality of coupons;
a controller module coupled to each of the coupon module and the communications network, the controller module operable to provide a group communication session by receiving a data packet from one member of the group communications net and transmitting the data packet through the computer network to at least one other member of the group communications net, the controller module further operable to monitor the group communication session and deliver a predetermined one of the plurality of coupons to the group communications net, and the controller module further operable to generate an activity log for each of the plurality of communication devices tracking participating in the group communication session and receipt of the predetermined coupon; and
a billing module operable to receive the activity log and generate a bill having an amount due for each of the plurality of communication devices, wherein the amount due is discounted based on the tracked receipt of the predetermined coupon associated with the respective communication device.

15. A coupon system operable with a communications network associated with a plurality of communications devices defining members of a group, comprising:
a communications manager connectable to the communications network and to at least two members of the group, the communications manager operable to provide a group communication session by receiving a transmission from one member of the group and forwarding the transmission through the communications network to at least one other member of the group, wherein the communications network comprises at least a wireless telephone network coupled to a computer network, wherein the transmission comprises a data packet;
a coupon module having a plurality of coupons each comprising a data packet; and
a controller module connectable to each of the coupon module and the at least two members of the group, the controller module operable to monitor the group communication session and deliver a predetermined one of the plurality of coupons to the group according to a predetermined delivery instruction.

16. A method for delivering a coupon, comprising:
receiving identification of a plurality of communications devices to be included in a group communications session, where each of the plurality of communications devices is associated with a communications network that comprises at least a wireless telephone network coupled to a computer network;
establishing the group communications session by receiving a data packet from one communications device and transmitting the data packet through the computer network to at least one of the other communications devices; and
delivering according to predetermined delivery characteristics one of a plurality of coupons via the communications network to the communications devices participating in the group communications session.

17. A system for delivering a coupon, comprising:
a means for networking a plurality of communications devices, the networking means comprising at least a wireless telephone network coupled to a computer network, the plurality of communication devices defining a group communications net;
a means for storing a plurality of coupons; and
a means for controlling communications coupled to each of the storing means and the networking means, the communications controlling means operable to provide a group communication session by receiving a data packet from one member of the group communications net and transmitting the data packet through the networking means to at least one other member of the group communications net, the communications controlling means further operable to monitor the group communication session and deliver a predetermined one of the plurality of coupons to the group communications net.

18. A system for delivering a coupon via a communications network to a plurality of communications devices defining members of a group, comprising:
a means for transmitting communications connectable to the communications network and to at least two members of the group, the transmitting means operable to provide a group communication session by receiving a transmission from one member of the group and forwarding the transmission through the communications network to at least one other member of the group, wherein the communications network comprises at least a wireless telephone network coupled to a computer network, wherein the transmission comprises a data packet in an internet protocol format;
a means for storing a plurality of coupons each comprising a data packet; and
a messaging means connectable to each of the storing means and the at least two members of the group, the messaging means operable to monitor the group communication session and deliver a predetermined one of the plurality of coupons to the group according to a predetermined delivery instruction.

* * * * *